United States Patent [19]
Andersson et al.

[11] 3,805,974
[45] Apr. 23, 1974

[54] APPARATUS FOR TRANSFERRING ARTICLES FROM STORAGE PATHS OF A ROLLER-TYPE CONVEYOR SYSTEM TO A TRANSFER UNIT

[75] Inventors: Börje Egon Andersson; Karl Håkan Göthberg, both of Saffle; Odd Johannes Strand, Enkoping, all of Sweden

[73] Assignee: Aktiebolaget Electrolux, Stockholm, Sweden

[22] Filed: Apr. 24, 1972

[21] Appl. No.: 246,650

[30] Foreign Application Priority Data
Apr. 26, 1971  Sweden................................ 5393/71

[52] U.S. Cl...................... 214/16.4 A, 214/16.1 CF
[51] Int. Cl............................. B65g 1/06, E04h 6/06
[58] Field of Search.... 198/20 T, 127 R, 105, 20 R; 214/16.4 A, 16.1 CF, 16.4 R

[56] References Cited
UNITED STATES PATENTS
3,674,159  7/1972  Lemelson...................... 214/16.4 A
2,972,423  2/1961  Thornher........................... 214/16.4

Primary Examiner—Evon C. Blunk
Assistant Examiner—Douglas D. Watts
Attorney, Agent, or Firm—Edmund A. Fenander

[57] ABSTRACT

A roller-type conveyor system has a plurality of storage paths which are near to one another and on which articles move downward by gravity in the same direction. Each storage path has a stop to arrest movement of an article from its lower end. An article transfer unit having spaced rollers receives articles from the lower ends of the storage paths.

The transfer unit is movable in front of the storage paths to a plurality of operating positions in each of which the unit can function to receive one or more articles from a different one of the storage paths. When the transfer unit is in any one of its operating positions, mechanism on the unit can be actuated to drive one or more rollers at the lower end of the storage path at such operating position and also render the stop ineffective to arrest movement of one or more articles from the storage path at such operating position.

8 Claims, 8 Drawing Figures

FIG. I

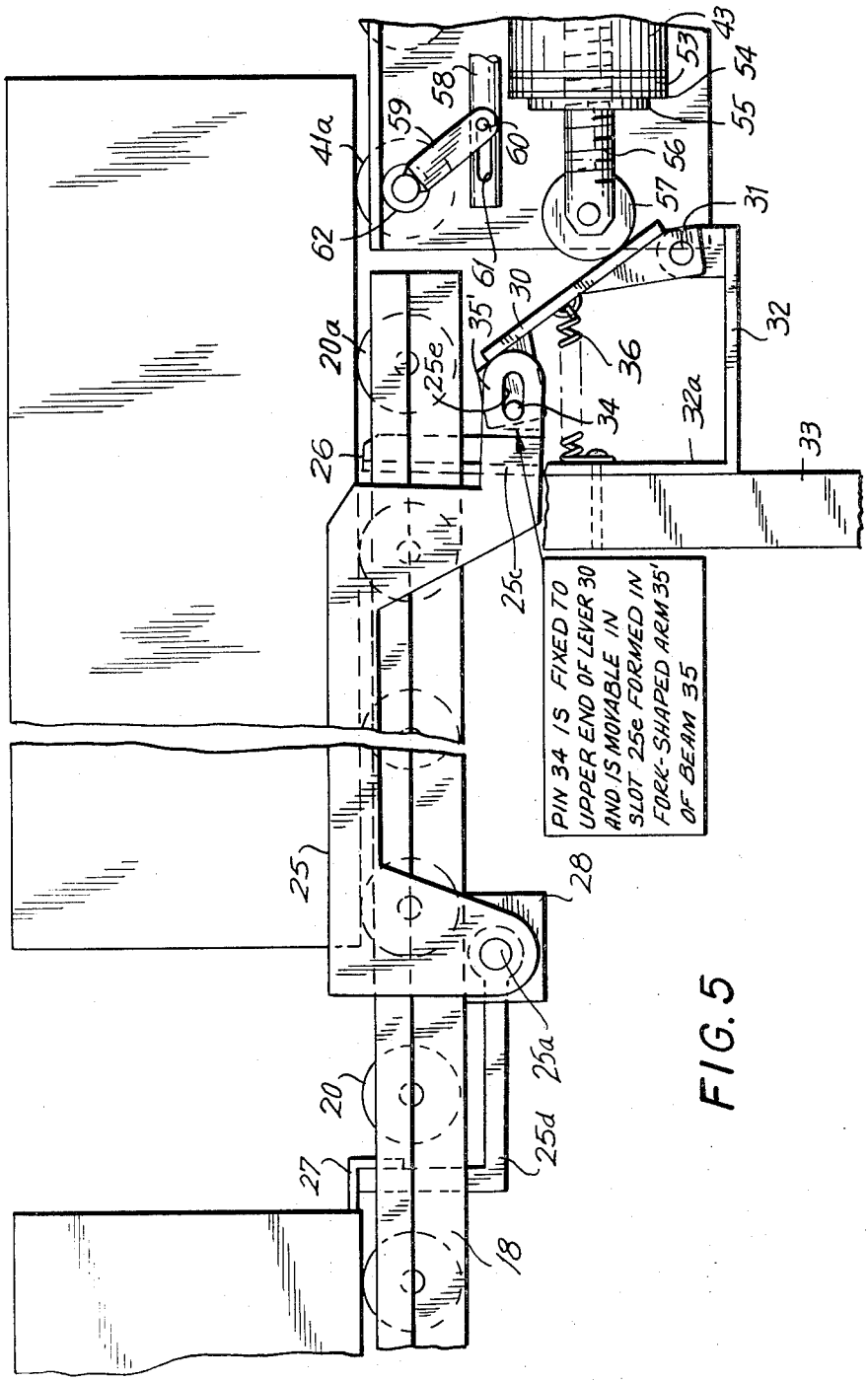

APPARATUS FOR TRANSFERRING ARTICLES FROM STORAGE PATHS OF A ROLLER-TYPE CONVEYOR SYSTEM TO A TRANSFER UNIT

BACKGROUND OF THE INVENTION

1. Field of the Invention

This invention relates to apparatus for transferring articles from storage paths of a roller-type conveyor system to a transfer unit which is movable in front of the storage paths.

2. Description of the Prior Art

In known conveyor systems each storage path has a first stop which functions to arrest movement of an article by gravity from its lower end. One or more rollers at the lower ends of the storage paths often are driven to promote movement of articles therefrom. In addition, a second stop has been provided to the rear of the first stop which functions to arrest movement of a second article on the storage path during the interval of time the first stop is rendered ineffective to arrest movement of the first article on the storage path.

To control the aforementioned stops and drive the rollers at the lower ends of the storage paths it has been necessary to provide driving means and control provisions for each storage path. This has involved the use of pneumatically-operated cylinders and valves which are associated with each storage path and pneumatically-operated control circuits for all of the storage paths and control provisions therefor. Such control provisions are complicated and costly which is objectionable. This is especially true in installations having a plurality of storage paths which not only are alongside one another but also at different levels. In such installations, when articles are transferred from many of the storage paths, provision must be made for transporting the articles horizontally at different levels and also vertically to a main receiving station.

SUMMARY OF THE INVENTION

It is an object of our invention to provide improved apparatus for transferring articles from a plurality of storage paths of a roller-type conveyor system to a mobile article transfer unit.

The transfer unit, which has spaced rollers to receive articles from the lower ends of the storage paths, is movable in front of the storage paths to a plurality of operating positions in each of which the unit can function to receive one or more articles from a different one of the storage paths, each of which has a stop to arrest movement of an article from its lower ends.

When the transfer unit is in any one of its operating positions, mechanism on the unit can be actuated to drive one or more rollers at the lower end of the storage path at such operating position and also render the stop ineffective to arrest movement of one or more articles from the storage path at such operating position.

BRIEF DESCRIPTION OF THE DRAWING

FIGS. 4 and 5 are enlarged fragmentary side elevations, partly broken away, of the lower end of the storage path shown in FIG. 2 to illustrate the construction more clearly;

DESCRIPTION OF THE PREFERRED EMBODIMENT

Figure 8:
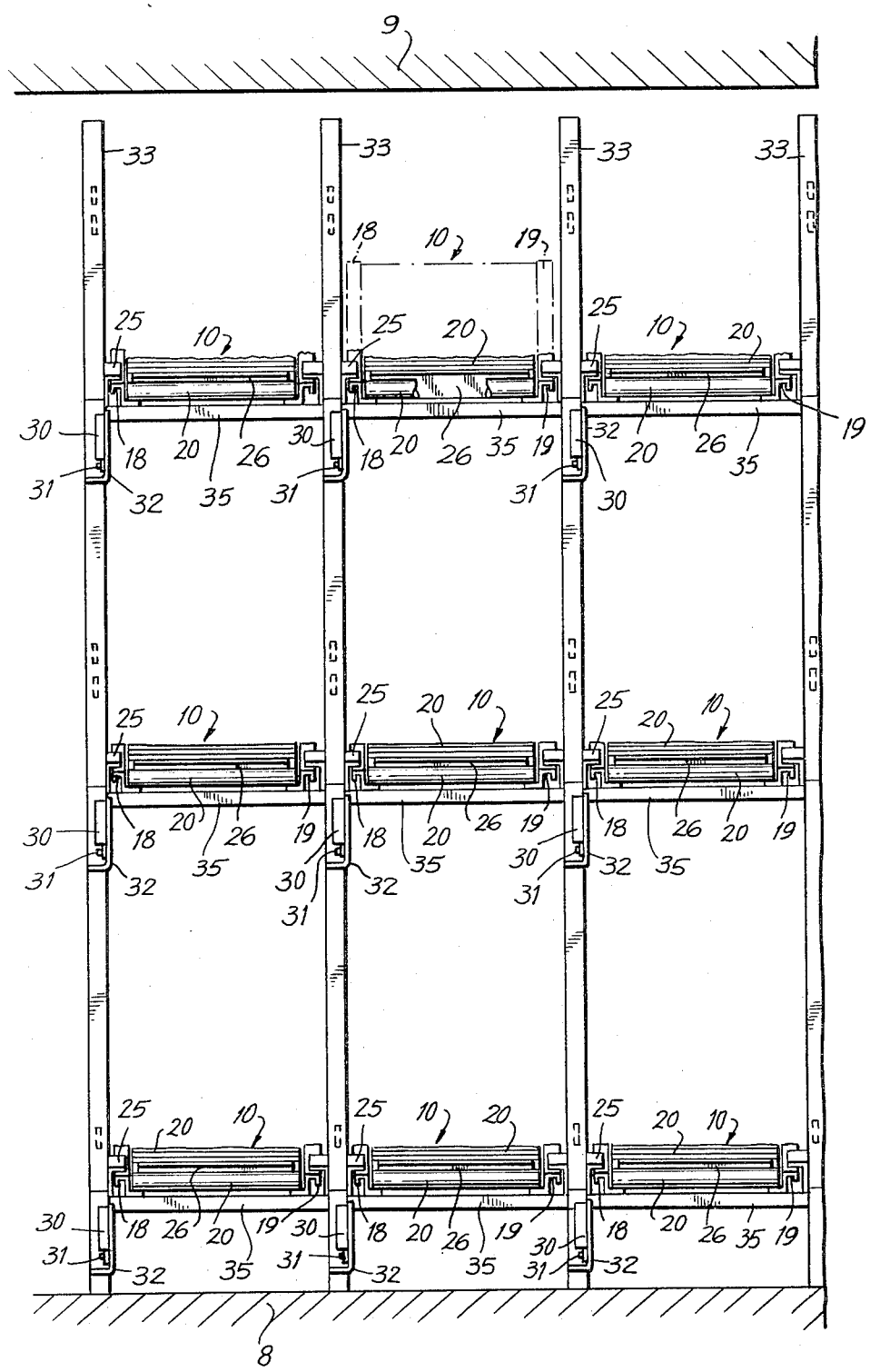
FIG. 8 is a front elevation of the conveyor system shown in FIG. 1 with the transfer unit omitted and the storage paths partly broken away.

Referring to the drawing, we have shown our invention in connection with a conveyor system having a plurality of stationary conveyors 10 which are substantially parallel and near to one another. The stationary conveyors 10 comprise spaced rollers 20 which define paths for storing articles and on which the articles move downward by gravity in the same direction. A stop 26 arrests downward movement of an article from the lower end of each storage path 10. Storage paths 10 are distributed at different levels one above another and alongside one another at each level as shown in FIG. 8. It will be understood that in the side elevation of the conveyor system shown in FIG. 1 only the end storage path 10 in each horizontal row of storage paths is illustrated.

Figure 1:
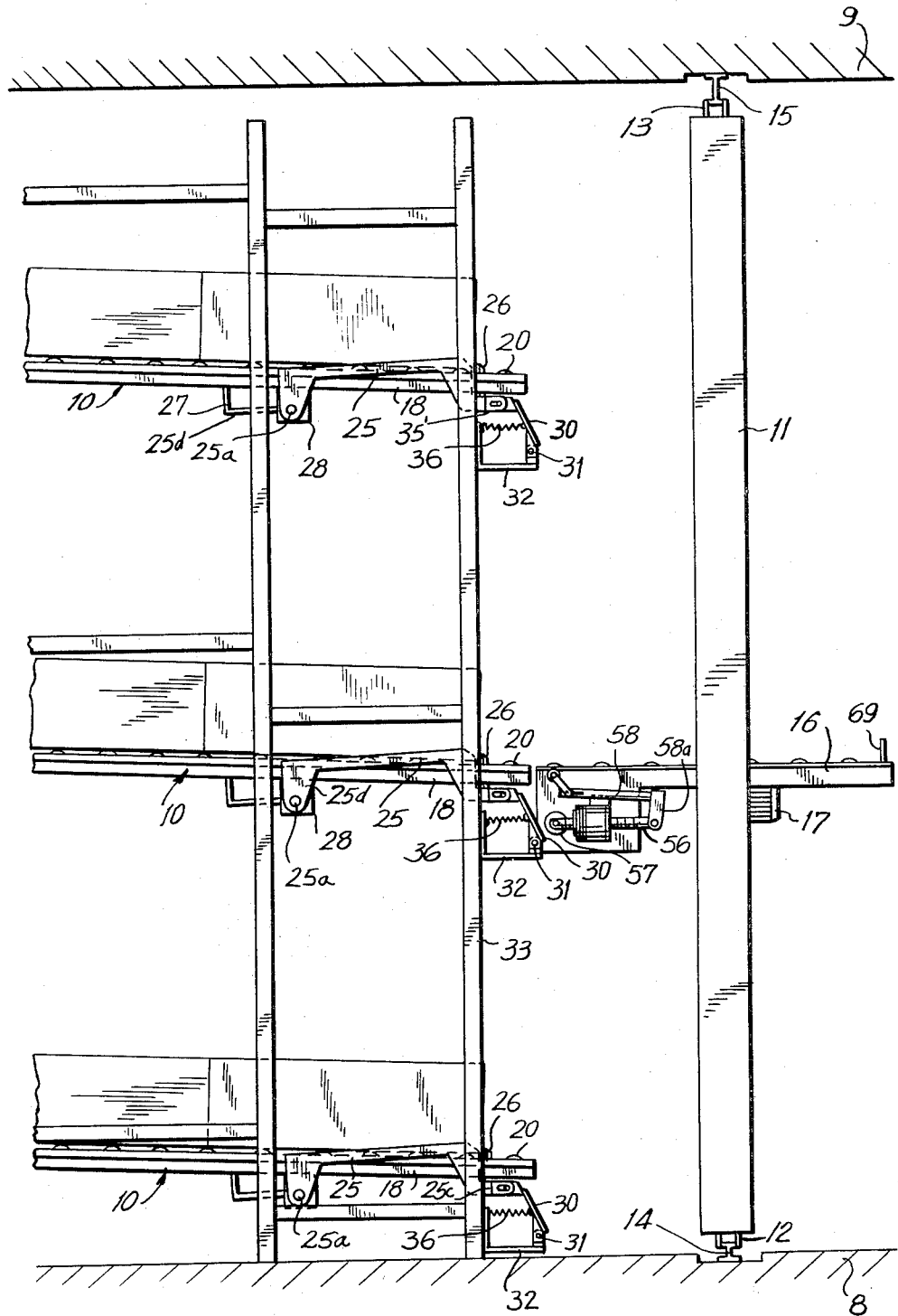
FIG. 1 is a side elevation of a roller-type conveyor system embodying our invention for transferring articles from storage paths to a transfer unit.
Figure 2:
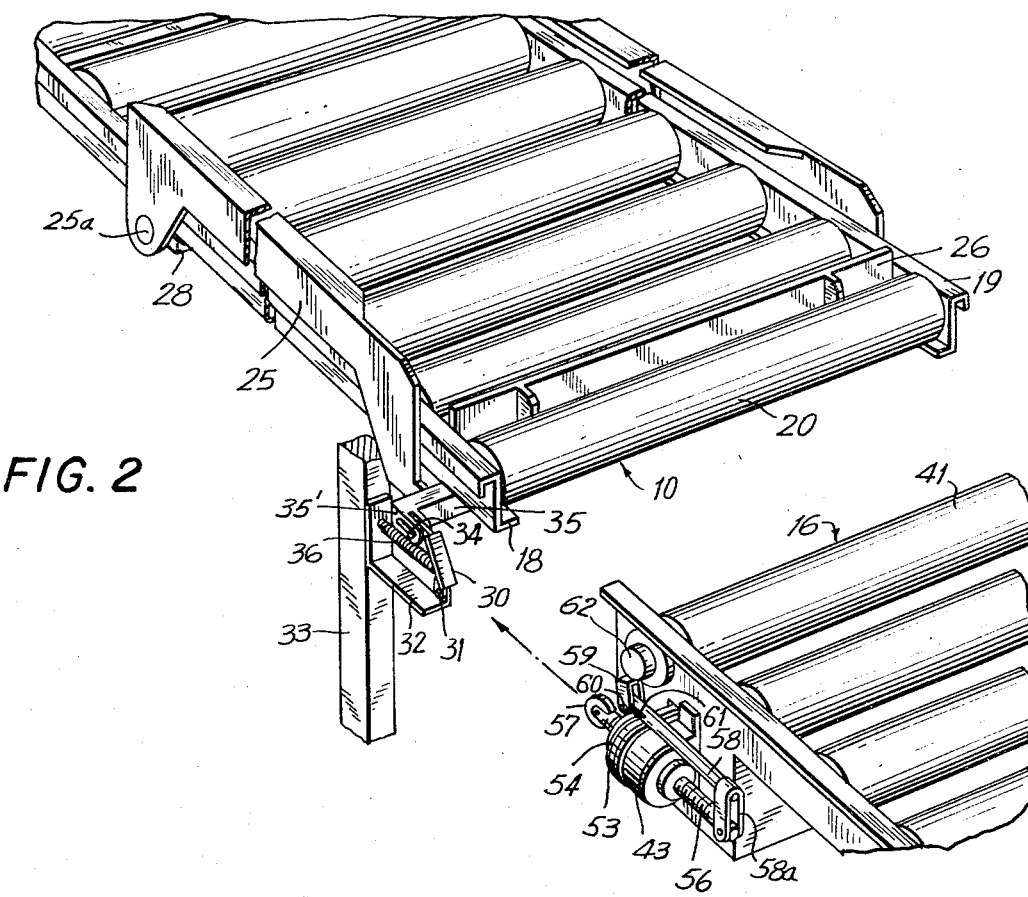
FIG. 2 is a fragmentary perspective view taken at one side of the lower end of one of the storage paths and forward end of the transfer unit shown in FIG. 1.

An article transfer unit 16 having spaced rollers 41 receives articles from the lower ends of the storage paths 10. The transfer unit 16 is mounted for horizontal and vertical movement in front of the lower ends of the storage paths 10. As shown in FIG. 1, such mounting structure comprises an upright frame or carriage 11 provided with wheels 12 and 13 at the bottom and top thereof. The wheels 12 and 13 move along tracks 14 and 15 at the floor and ceiling 8 and 9, respectively, of an enclosure in which the conveyor system is installed. The transfer unit 16 is mounted on the frame 11 and is vertically movable between the different levels of the storage paths 10 and also horizontally movable toward and from the lower ends of the storage paths.

Movement of the frame 11 on the tracks 14 and 15 and vertical and horizontal movement of the transfer unit 16 on the frame 11 can be effected manually or by suitable mechanism (not shown). For example, the frame 11 may be provided with mechanism driven by an electric motor for moving it along the tracks 14 and 15. A motor 17 on the transfer unit 16 may be employed to actuate mechanism (not shown) to move the unit vertically on the frame 11. Motor or hand operated screw feed mechanism may be employed to move the transfer unit 16 horizontally on the frame 11 toward and from the lower front ends of the storage paths 10.

Each storage path 10 is provided with a pair of stop members 26 and 27. The stop members 26 arrest downward movement of articles from the lower ends of the storage paths 10. When a stop member 26 is rendered ineffective to arrest movement of an article from the lower end of a storage path, the stop member 27 associated therewith is rendered operable to arrest movement of an article behind the first article moving from each storage path 10.

The stop members 26 and 27 form transverse end components of a cradle-like part 25 pivoted at 25a and 25b in brackets 28 and 29, respectively, which are fixed to side frames 18 and 19 of the storage paths 10. The stop member 26, which extends transversely of the storage path 10 between the two lowermost rollers 20a and 20b, is fixed to the outer ends of spaced arms 25c of the cradle-like part 25 which extend forward from the pivoted regions 25a and 25b thereof.

The stop member 27, which extends transversely of the storage path between two adjacent rollers 20 removed from the lower end of the storage path, is fixed to the outer ends of spaced arms 25d of the cradle-like part 25 which extend rearward from the pivoted regions 25a and 25b thereof. It will be understood that the arms 25c and 25b form unitary parts of the cradle-like part 25 and are immovable with respect to one another.

Mechanism for rocking the cradle-like part 25 about its pivots at 25a and 25b comprises a lever 30 pivoted at its lower end at 32 to an angle bracket 31 fixed to an upright structural supporting member 33 of the conveyor system. To the upper end of the lever 30 is fixed a pin 34 which is movable in a slot or elongated opening 25e formed in a fork-shaped arm 35' of a beam 35 which extends between the forward extending arms 25c of the cradle-like part 25 and is fixed thereto at a region below the stop member 26. This provides a loose pivotal connection between the lever 30 and cradle-like part 25 to enable the cradle-like part to move from its position illustrated in FIG. 4 to its position illustrated in FIG. 5 when the lever 30 is moved from its position shown in FIG. 4 to its position shown in FIG. 5 in a manner that will be explained presently. A compression spring 36, which is arranged between an arm 32a of the angle bracket 32 and the lever 30, functions to bias the latter to its position shown in FIG. 4 and move the cradle-like part 25 to its position illustrated in FIG. 4.

Figure 6:
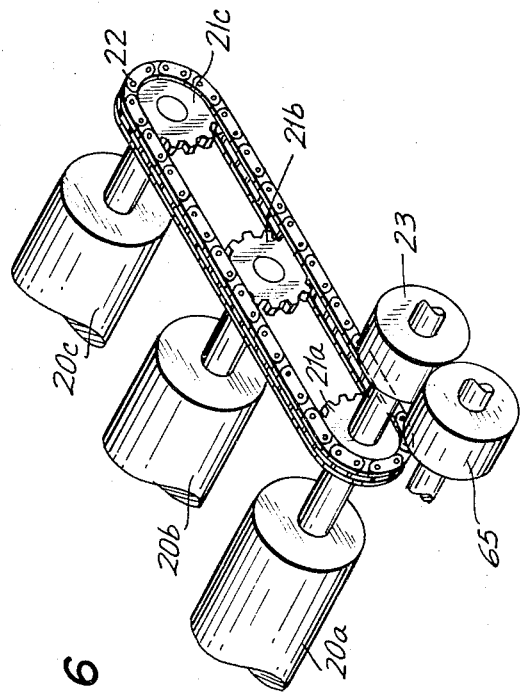
FIG. 6 is an enlarged fragmentary perspective view taken at line 6—6 of FIG. 3.

When the article transfer unit 16 is moved in front of a storage path 10 to effect removal of an article from its lower end, rotating movement is imparted to the extreme end roller 20a which is in front of the stop member 26. In order that the end roller 20a can impart rotating movement to the two rollers 20b and 20c adjacent thereto, the shafts of the rollers 20a, 20b and 20c, at the regions thereof outside the side frame 19, are provided with sprocket wheels 21a, 21b and 21c, respectively, as shown in FIG. 6. An endless chain 22 extends about the sprocket wheels 21a, 21b and 21c and coacts therewith. A member 23 is fixed to the shaft of the extreme end roller 20a and is rotatable therewith. When the article transfer unit 16 is moved in front of a storage path 10 in operative association therewith in a manner that will be explained presently, a rotatable member 65 on the unit 16 frictionally engages the member 23 on the roller 20a and functions to drive the latter and also the rollers 20b and 20c.

Figure 7:
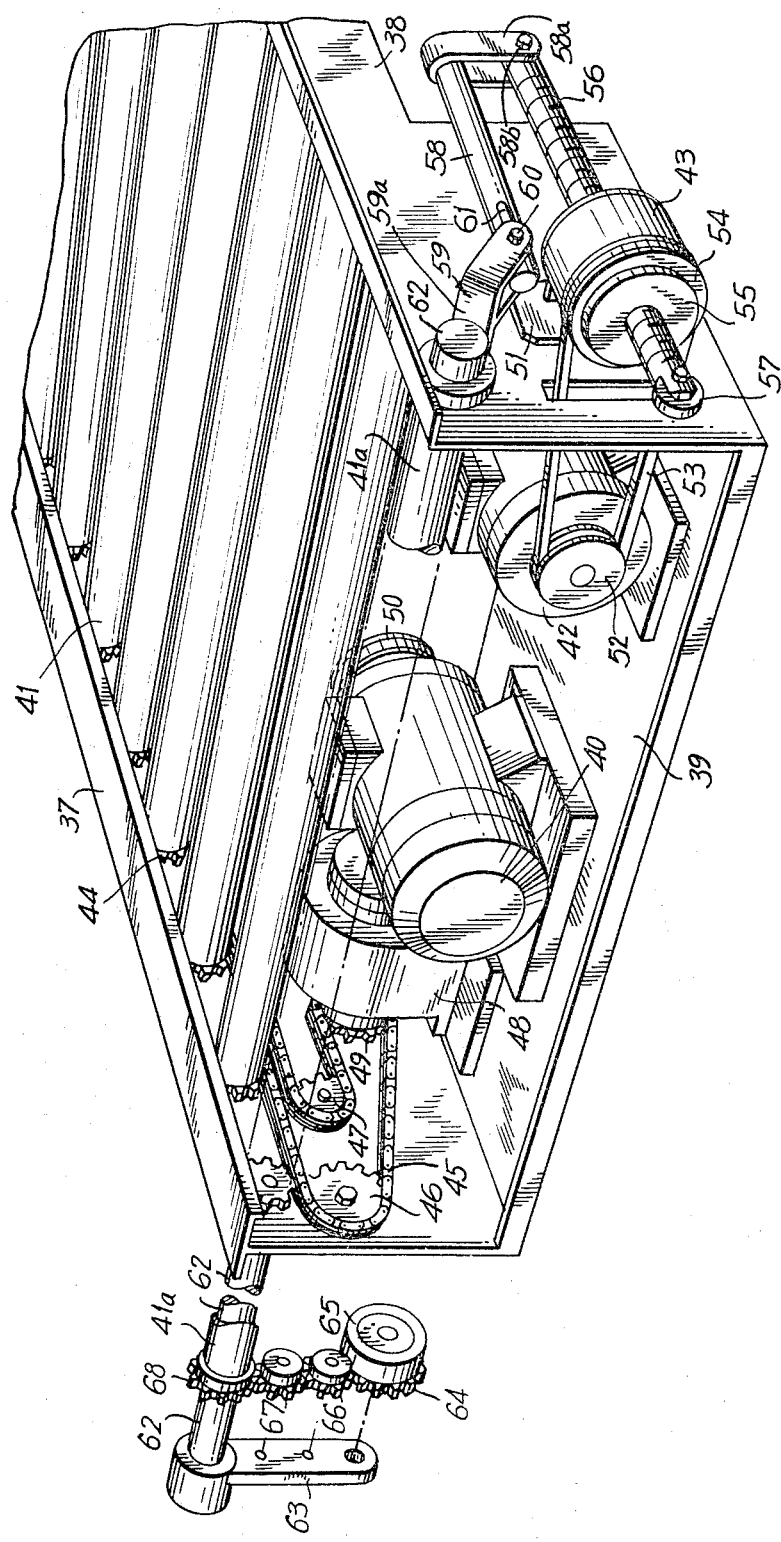
FIG. 7 is a fragmentary perspective view, partly exploded, of the transfer unit shown in FIG. 1.

The article transfer unit 16 comprises a plurality of rollers 41 rotatably mounted in side frames 37 and 38 which are connected at their ends by flat end beams, one of which is shown at 39 in FIG. 7. The rollers 41 are provided with sprocket wheels 44. An endless chain 45, which coacts with the sprocket wheels 44 and extends about sprocket wheels 46 and 47, is driven by a sprocket wheel 49 fixed to an output shaft of a gear reduction unit 48. The input shaft of the gear reduction unit is connected by an endless belt 50 driven by a pulley fixed to the shaft of a motor 40. As seen in FIG. 7, the gear reduction unit 48 and motor 40 are mounted on the end beam 39.

Mechanism 43 is provided on the transfer unit 16 which functions to render the stop member 26 ineffective to arrest downward movement of an article from the lower end of the storage path 10 with which the unit is in operative association. The mechanism 43 is mounted on the side frame 38 by a plate 51 and comprises a probing member 57 freely rotatable about a horizontal axis at the forward end of a lead screw 56. The lead screw 56 is moved lengthwise between forward and rearward positions by an internally threaded rotatable nut 55 which coacts therewith.

A pulley 54 is coaxial with the internally threaded nut 55 and fixed thereto. An endless belt 53 extends about the pulley 54 and a pulley 52 fixed to a shaft of a motor 42 mounted on the beam 39. It will now be understood that when the motor 42 operates in one direction the nut 55 functions to move the lead screw 56 forward; and when the motor 42 operates in the opposite direction the nut 55 functions to move the lead screw 56 rearward.

The rotatable member 65 on the transfer unit 16, which functions to drive the rotatable member 23 on the extreme end roller 20a of a storage path 10 when in frictional engagement therewith, is rotatably mounted at the outer end of an arm 63, the inner end of which is fixed to and angularly movable with a shaft 62. The shaft 62 extends through the roller 41a and is rotatable with respect to the latter.

The arm 63 is anchored to that part of shaft 62 which is outside the side frame 37. A gear 68 is fixed to the roller 41a and rotatable therewith. Gears 67, 63 and 64, which coact with gear 68, are rotatably mounted on the arm 63. Member 65 is fixed to and rotatable with gear 64. It will now be understood that, when the motor 40 is functioning to drive the rollers 41 of the transfer unit 16, rotating movement will be transmitted from the roller 41a to the member 65 on the arm 63 through the gears 68, 67, 66 and 64, respectively.

Figure 3:
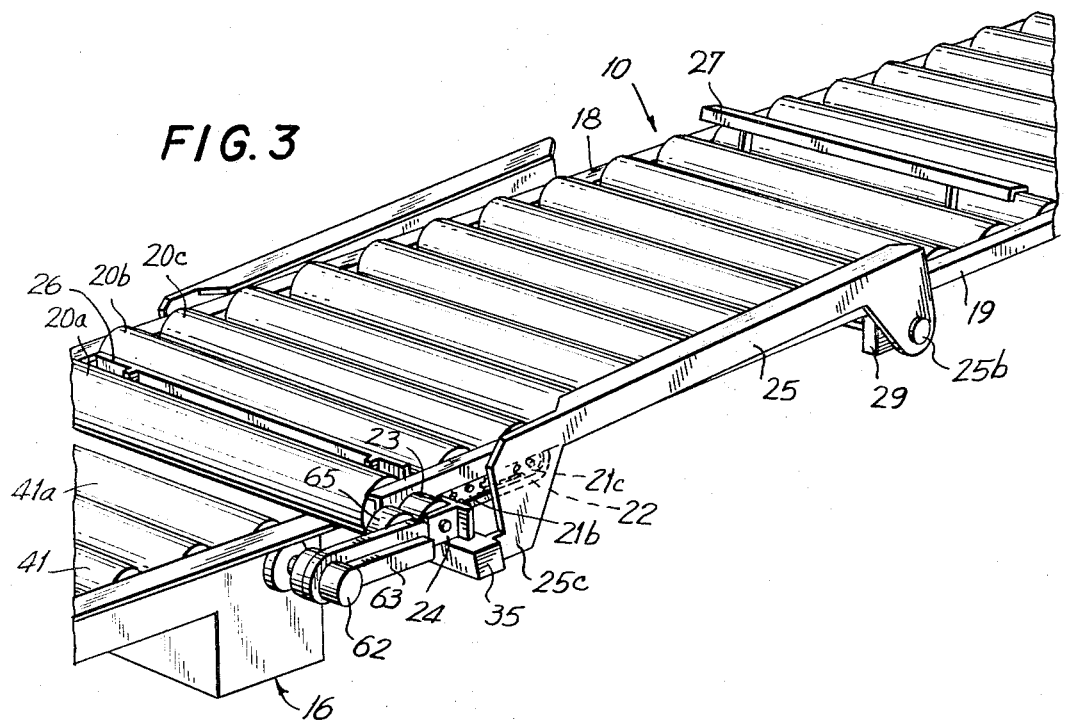
FIG. 3 is another fragmentary perspective view taken at an opposite side of one of the storage paths and forward end of the transfer unit shown in FIG. 1.

The arm 63 is movable between two positions, one of which is illustrated in FIG. 3. When the arm 63 is in the vertical position shown in FIG. 7 the lead screw 56 is in its rearward position. When the arm 63 is in its horizontal position shown in FIG. 3, the lead screw 56 is in its forward position.

A connection is provided on the transfer unit 16 for moving the arm 63 from its vertical position in FIG. 7 to its horizontal position in FIG. 3 responsive to movement of the lead screw 56 from its rearward position to its forward position. This connection includes a link 58 having at its rear end a fork-shaped part 58a connected at 58b to the rear end of the lead screw 56. The forward end of the link 58 is formed with an elongated slot 61 which receives a bolt 60 fixed to the open end of a fork-shaped part 59. The closed end of the fork-shaped part 59 defines a lever 59a which extends outside the spaced arms of the part 59 and is fixed to an end of the shaft 62.

It will now be understood that when the lead screw 56 moves to its forward position the link 58, with the aid of the fork-shaped part 59, turns the shaft 62 and moves the arm 63 from its vertical position in FIG. 7 to its horizontal position in FIG. 3.

In view of the foregoing, it will now be understood that the article transfer unit 16 constitutes a mobile unit which, with the aid of the frame 11, can be moved manually or by suitable mechanism to a plurality of "operating positions" in each of which the unit 16 can function to receive one or more articles from a different one of the storage paths. The term "operating position" in the specification and claims means that the transfer unit 16 is located in front of a storage path 10 in operative association therewith so that, when the mechanism 43 on the transfer unit 16 is actuated, the roller 57 on the mechanism will move lever 30 to render stop member 26 ineffective by shifting it from its position shown in FIG. 4 to its position shown in FIG. 5 and also move arm 63 from its vertical position in FIG. 7 to its horizontal position in FIG. 3 and bring rotatable member 65 in frictional engagement with rotatable member 23 on the roller 20a.

In the preferred embodiment which has been described above and shown in the drawing the lower ends of the stationary conveyors or storage paths 10 are disposed substantially in the same vertical plane and the transfer unit 16 is mounted for movement on the frame 11 in a plane substantially parallel to the vertical plane passing through the lower ends of the storage paths.

When the transfer unit 16 has been moved to an operating position in front of a storage path 10, the motors 40 and 42 can be started manually or by a suitable control (not shown) which may include a micro-switch on the carriage or frame 11 which completes the circuits for the motors responsive to movement of the transfer unit to the operating position. This activates the rollers 41 and the rotatable member 65 which are driven by the motor 40 in the manner explained above. The motor 42 drives the internally threaded nut 55 which becomes operable to move the lead screw 56 to its forward position from its rearward position shown in FIG. 7.

In the forward position of the lead screw 56 the roller 57 at its front end engages the lever 30 and rocks the cradle-like part 25 to move the stop member 26 downward, as seen in FIG. 5, so that the latter will become ineffective to arrest downward movement of an article on the storage path 10, as shown in FIG. 5. At the same time the stop 27 is moved upward and becomes operable to arrest movement of an article behind the first article. It should be clear that stop 27 becomes effective to arrest movement of the second article before the stop 26 moves out of the path of movement of the first article on the storage path.

Forward movement of the lead screw 56 also effects forward movement of the link 58. But the link 58 will not be effective immediately to act on the lever 59a and turn the shaft. Only after the lead screw 56 has moved forward a sufficient distance for the roller 57 to act on the lever 30 and initiate rocking of the cradle-like part 25 to release an article on the storage path 10 will the right end of the slot 61 in FIG. 7 engage bolt 60 and activate lever 59a and turn shaft 62 clockwise to shift arm 63 from its vertical position in FIG. 7 to its horizontal position in FIG. 3.

Hence, after the stop 26 has moved downward and is out of the path of movement of the article the arm 63 will be moved to its horizontal position in FIG. 3 and bring rotatable member 65 in frictional engagement with rotatable member 23. When this occurs rollers 20a, 20b and 20c commence to rotate to promote movement of the released article from the lower end of the storage path 10 to the transfer unit 16.

Figure 4:
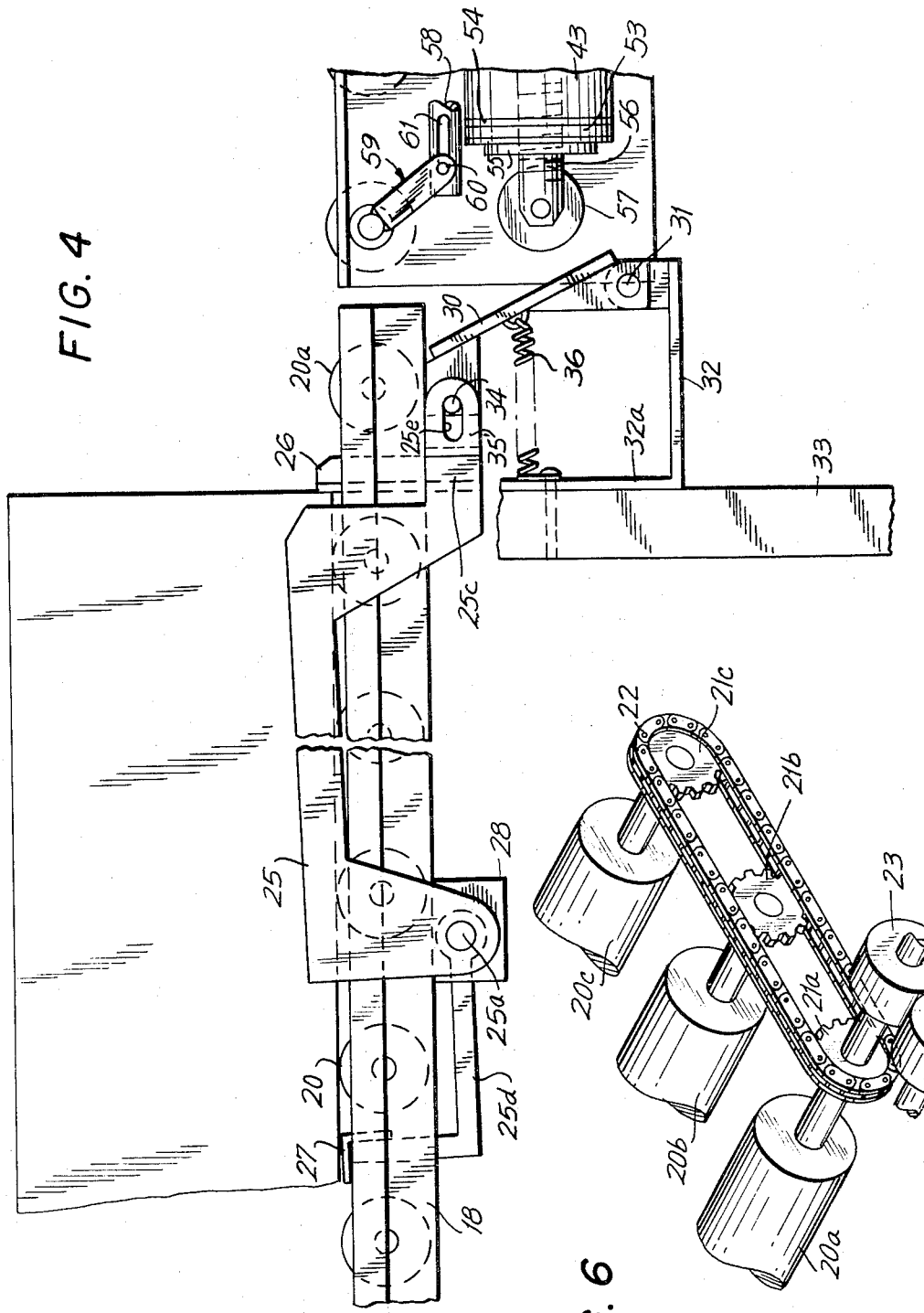

When the lead screw 56 is in its rearward position and the roller 57 no longer acts on the lever 30, the compression spring 36 becomes effective to bias the lever 30 toward the right, as shown in FIG. 4. This raises the stop member 26 and lowers the stop member 27, thereby releasing the article held behind the stop member 27 and allowing it to move forward to the stop member 26. With the lead screw 56 in its rearward position, the arm 63 is in the vertical position shown in FIG. 7 and the rotatable member 65 will be out of frictional engagement with the rotatable member 23.

The foregoing control provisions have been referred to simply to illustrate one manner in which the different components of the transfer unit 16 can be actuated in orderly sequence and automatically effect transfer of articles from the storage paths 10 to a receiving station or loading platform. It should be clear, however, that operation of the conveyor system shown in the drawing and described above can be effected manually to accomplish the same end result. Hence, the following claims forming a part of this specification are directed solely to features of the invention which are illustrated in the drawing and the control features referred to above are absent from the claims for the reason that they do not form a part of this invention.

We claim:

1. In a conveyor system,
   a. a plurality of stationary conveyors which are substantially parallel and near to one another and comprise spaced rollers defining paths for storing articles and on which the articles move downward by gravity in the same direction,
   b. stop means to arrest downward movement of an article from the lower end of each stationary conveyor,
   c. an article transfer unit having spaced rollers for receiving articles from the lower ends of said stationary conveyors,
   d. means for mounting said transfer unit for movement in front of the lower ends of said stationary conveyors, said mounting means including provisions for moving said transfer unit to a plurality of operating positions in each of which said unit can function to receive at least one article from a different one of said stationary conveyors,
   e. structure on said transfer unit including actuating mechanism which, when said transfer unit is in one of its operating positions, is operable to drive at least one roller at the lower end of said stationary conveyor at said one operating position and also operable to render said stop means ineffective to arrest movement of at least one article from the lower end of said stationary conveyor at said one operating position,
   f. said actuating mechanism including first means which, when said transfer unit is in one of its operating positions, is operable to render said stop means ineffective to arrest movement of at least one article from the lower end of said stationary conveyor at said one operating position, and
   g. second means movable between an inoperable position and an operable position in which said mechanism can function to drive at least one roller at the lower end of said stationary conveyor at said one operating position of said unit, h. said second means being movable from its inoperable position to its operable position responsive to operation of said first means,
i. said first means of said actuating mechanism comprising a lead screw movable lengthwise between forward and rearward positions by a rotatable nut which coacts therewith and is driven by said mechanism,
j. said lead screw in its forward position effecting operation of said first means to render said stop means ineffective to arrest movement of at least one article from the lower end of said stationary conveyor at said one operating position of said unit, and
k. said second means of said actuating mechanism being movable from its inoperable position to its operable position responsive to movement of said lead screw to its forward position,
l. said stop means of each stationary conveyor comprising a first stop member,
m. additional stop means for each stationary conveyor comprising a second stop member,
n. said first and second stop members being so constructed and arranged that, when said first stop member is rendered ineffective to arrest movement of an article from the lower end of each stationary conveyor, said second stop member is rendered operable to arrest meovement of an article behind the first article moving from each stationary conveyor,
o. said first and second stop members forming end components of a cradle-like part which is pivoted intermediate its ends and is so constructed and formed that said second stop member on each stationary conveyor is rendered operable to arrest movement of an article behind the first article before said first stop member is rendered ineffective to arrest movement of the first article,
p. a lever pivoted for movement between first and second positions, means for resiliently biasing said lever to its first position in which said first member of said cradle-like part is operable to arrest movement of an article from the lower end of each stationary conveyor, and
q. means including said lead screw in its forward position, when said transfer unit is in one of its operating positions, for moving said lever from its first to its second position against the biasing action of said resilient means to rock said cradle-like part to render said first stop member ineffective to arrest movement of the first article.

2. In a conveyor system,
a. a plurality of stationary conveyors which are substantially parallel and near to one another and comprise spaced rollers defining paths of storing articles and on which the articles move downward by gravity in the same direction,
b. stop means to arrest downward movement of an article from the lower end of each stationary conveyor,
c. an article transfer unit having spaced rollers for receiving articles from the lower ends of said stationary conveyors,
d. means for mounting said transfer unit for movement in front of the lower ends of said stationary conveyors, said mounting means including provisions for moving said transfer unit to a plurality of operating positions in each of which said unit can function to receive at least one article from a different one of said stationary conveyors,
e. structure on said transfer unit including actuating mechanism which, when said transfer unit is in one of its operating positions, is operable to drive at least one roller at the lower end of said stationary conveyor at said one operating position and also operable to render said stop means ineffective to arrest movement of at least one article from the lower end of said stationary conveyor at said one operating position,
f. one of said rollers at the lower end of each stationary conveyor including a first member which is mounted thereon and rotatable therewith,
g. said actuating mechanism on said transfer unit including an arm pivoted for movement between first and second positions and a second member which is mounted for rotation on said arm and driven by said actuating mechanism,
h. said actuating mechanism, when said arm is in its second position and said transfer unit is in one of its operating positions, functioning to render said second member operable to drive said first member and roller with which it is associated,
i. said actuating mechanism including means for driving the rollers of said transfer unit, and means including at least one of said last-mentioned rollers for driving said second member mounted for rotation on said arm,
j. said means for driving said second member including gearing mounted on said arm, said gearing being interposed between said one roller of said transfer unit and said second member,
k. said actuating mechanism comprising a lead screw movable lengthwise between forward and rearward positions by a rotatable nut which coacts therewith and is driven by said mechanism,
l. said lead screw in its forward position functioning to render said stop means ineffective to arrest movement of at least one article from the lower end of said stationary conveyor at said one operating position of said unit, and
m. a shaft mounted on said unit for movement about its longitudinal axis, said arm being fixed to said shaft and angularly movable therewith, and means including said lead screw for angularly moving said shaft and moving said arm to its second position responsive to movement of said lead screw to its forward position.

3. A conveyor system as set forth in claim 2 in which said shaft is disposed lengthwise of and within said one roller of said transfer unit, said shaft and said one roller being movable with respect to one another about their longitudinal axes.

4. In a conveyor system,
a. a plurality of stationary conveyors which are substantially parallel and near to one another and comprise spaced rollers defining paths for storing articles and on which the articles move downward by gravity in the same direction,
b. stop means to arrest downward movement of an article from the lower end of each stationary conveyor,
c. a mobile article transfer unit having means for receiving articles from the lower ends of said stationary conveyors, d. means for mounting said mobile unit for movement in front of the lower ends of said stationary conveyors, said mounting means including provisions for moving said mobile unit to a plurality of operating positions in each of which said mobile unit can function to receive at least one article from a different one of said stationary conveyors, e. said mobile unit comprising structure including actuating mechanism which, when said mobile unit is in one of its operating positions, is operable to drive at least one roller at the lower end of said stationary conveyor at said one operating position and also operable to render said stop means ineffective to arrest movement of at least one article from the lower end of said stationary conveyor at said one operating position, f. said actuating mechanism including first means which, when said mobile unit is in one of its operating positions, is operable to render said stop means ineffective to arrest movement of at least one article from the lower end of said stationary conveyor at said one operating position, g. second means including a part supported entirely by said mobile unit and bodily movable between an inactive position and an active position removed therefrom in which said mechanism can function to drive at least one roller at the lower end of said stationary conveyor at said one operating position of said mobile unit, h. said part of said second means only being bodily movable from its inactive position to its active position responsive to operation of said first means, i. said first means of said actuating mechanism comprising a lead screw bodily movable axially between forward and rearward positions by a rotatable nut which coacts therewith and is driven by said mechanism, j. said lead screw in its forward position effecting operation of said first means to render said stop means ineffective to arrest movement of at least one article from the lower end of said stationary conveyor at said one operating position of said mobile unit, and k. said part of said second means of said actuating mechanism only being bodily movable from its inactive position to its active position removed therefrom responsive to axial bodily movement of said lead screw to its forward position.

5. In a conveyor system, a. a plurality of first stationary conveyors which are disposed laterally of one another and at several levels, said first conveyors comprising spaced rollers defining paths for storing articles and on which the articles move downward by gravity in the same direction, b. each stationary conveyor having stop means to arrest downward movement of an article from its lower end, c. a second conveyor comprising spaced rollers defining a path for moving articles, d. means for driving the rollers of said second conveyor, e. said second conveyor and driving means therefor forming parts of a mobile unit, f. means for mounting said mobile unit for movement in front of the lower ends of said first conveyors, said mounting means including provisions for moving said unit to a plurality of operating positions in each of which said unit can function to transfer to said second conveyor at least one article from a first conveyor with which said second conveyor is operatively associated, g. structure associated with said mobile unit including first mechanism having a part supported entirely by said mobile unit for transmitting motion from said driving means to at least one roller at the lower end of one of said first conveyors with which said second conveyor is operatively associated and second release mechanism for rendering said stop means ineffective to arrest movement of at least one article from said one first conveyor, h. said structure being so constructed and arranged that said second release mechanism is operable to bodily move said part of said first motion transmitting mechanism toward and from said one roller of said first conveyor with which said second conveyor is operatively associated, , i. said second release mechanism comprising a lead screw bodily movable between forward and rearward positions by a rotatable nut which coacts therewith, j. said mobile unit including means for rotating said nut, k. said second release mechanism with said lead screw in its forward position rendering said stop means ineffective to arrest movement of at least one article from the lower end of one of said first conveyors with which said second conveyor is operatively associated, l. said second release mechanism with said lead screw in its rearward position rendering said stop means effective to arrest movement of an article from the lower end of a first conveyor with which said second conveyor is operatively associated, and m. said second release mechanism being operable to bodily move said part of said first motion transmitting mechanism toward and from said one roller of said first conveyor with which said second conveyor is operatively associated with said lead screw in its forward and rearward positions, respectively.

6. A conveyor system as set forth in claim 5 which includes a. a first rotatable member operatively associated with said one roller at the lower end of each of said first conveyors, b. said mobile unit including a pivotally mounted arm, c. said part comprising a second rotatable member journaled on said arm, d. gearing carried on said arm, e. said first mechanism including a roller of said second conveyor and said gearing for driving said second rotatable member, and f. said structure being so constructed and arranged that, (1) with said lead screw in its forward position, said release mechanism is operable to swing said arm to bodily move said second rotatable member thereon into engagement with said first rotatable member associated with said one roller with which said second conveyor is operatively associated; and, (2) with said lead screw in its rearward position, said release mechanism is operable to swing said arm to bodily move said second rotatable member thereon out of engagement with said aforementioned first rotatable member.

7. A conveyor system as set forth in claim 6 in which a. said first mechanism further includes a shaft journaled for rotation on said mobile unit,
b. means for fixing said arm to one end of said shaft for movement therewith, and
c. means connecting the other end of said shaft to said release mechanism, said connecting means being so constructed and arranged that back and forth bodily movement of said lead screw is converted to turning movement of said shaft about its axis.

8. A conveyor system as set forth in claim 7 in which said roller of said second conveyor functioning as a component of said first motion transmitting mechanism is hollow, said shaft extending through said hollow roller.

* * * * *